Oct. 30, 1962  K. L. KIRK  3,060,585
COOKING TIME INDICATOR
Filed Oct. 5, 1959
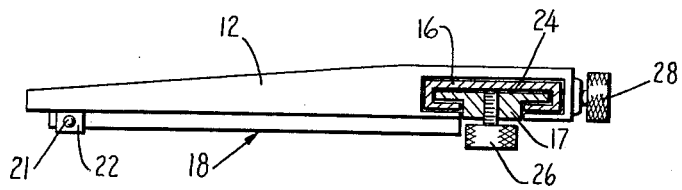
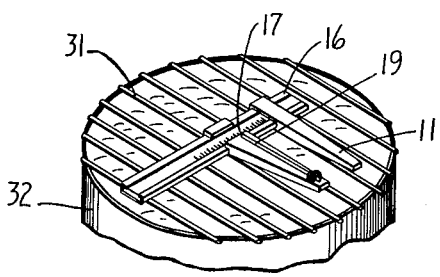
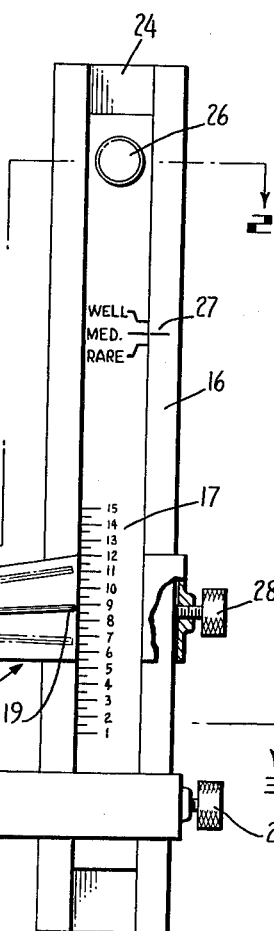
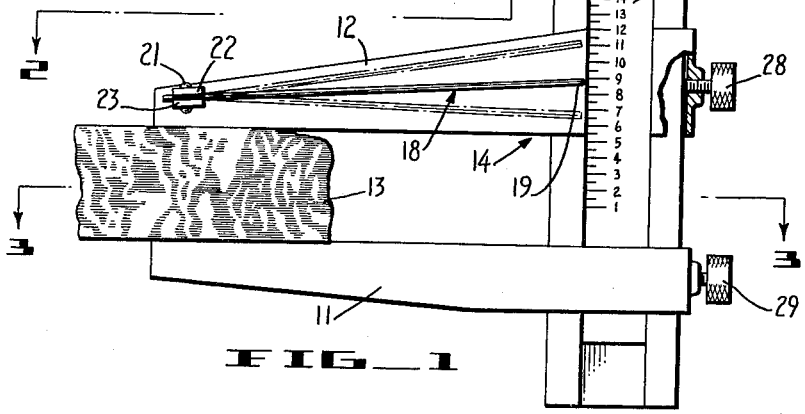
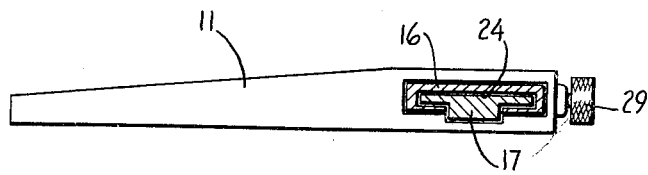
INVENTOR.
Kirk L. Kirk
BY
Schapp & Hatch
ATTORNEYS United States Patent Office 3,060,585
Patented Oct. 30, 1962

3,060,585
COOKING TIME INDICATOR
Kirk L. Kirk, 1948 Green St., San Francisco 23, Calif.
Filed Oct. 5, 1959, Ser. No. 844,516
9 Claims. (Cl. 33—143)

This invention relates to improvements in a cooking time indicator, and more particularly to thermostatically controlled cooking aids.

In cooking and grilling of foods, and especially in the barbecueing and roasting of meats, it is often difficult for the cook to determine in advance how long a cooking time will be required. This is because the cooking time will depend upon the thickness of the piece of food as well as upon the temperature at the cooking area.

Thermostatic gauges have been provided to indicate the temperature of a cooking area such as the interior of an oven, but determination of the cooking time with respect to the thickness of a piece of food must still be computed by the cook.

The present invention contemplates a device which will measure both the thickness of the food and the temperature of the cooking area, and which will automatically correlate these measurements and indicate the correct cooking period in minutes or other units of time.

To be effective, such a device should provide for indicating the correct cooking times to achieve different degrees of doneness, for example rare, medium or well done. The indicator should also be sturdy, simple and easy to use and clean.

It is, therefore, an object of the present invention to provide a device for indicating the correct cooking time for a particular piece of food at a particular cooking surface or area.

Another object of the invention is to provide a cooking time indicator which may be applied to the piece of food to determine thickness and which, when placed in the cooking area, will automatically indicate the correct cooking time in minutes or other units of time.

A further object of the present invention is to provide a cooking time indicator of the character described which may be adjusted to indicate the correct cooking time for different degrees of doneness.

A still further object of the invention is to provide a cooking time indicator of the character described in which a temperature responsive element will indicate cooking time on an easily readable scale.

Yet another object of the invention is the provision, in a cooking time indicator of the character described, of means for selectively locking the parts in position so as to prevent incorrect readings caused by misalignment of the parts during transfer from the piece of food to the cooking area.

And finally, it is an object of this invention to provide a cooking time indicator of the character described which is of sturdy construction and attractive appearance, and which is simple to operate and easy to clean.

Further objects and advantages of my invention will appear as the specification proceeds, and the new and useful features of the same will be fully defined in the claims hereto attached.

The preferred form of my invention is illustrated in the accompanying drawing, forming part of this application, in which:

FIGURE 1 shows a side elevational view of a cooking time indicator constructed in accordance with the present invention and illustrated as being applied to a piece of steak, portions of the device being broken away and shown in section, to reveal internal construction;

FIGURE 2, a plan sectional view taken substantially on the plane of line 2—2 of FIGURE 1;

FIGURE 3, a plan sectional view taken substantially on the plane of line 3—3 of FIGURE 1; and FIGURE 4, a perspective view of a barbecue brazier with my cooking time indicator operatively positioned thereon.

While I have shown only the preferred form of my invention, I wish to have it understood that various changes or modifications may be made within the scope of the claims hereto appended, without departing from the spirit of the invention.

Referring to the drawing in detail, the cooking time indicator of the present invention includes a pair of leg members 11 and 12, mounted in movable spaced relation for gauging the thickness of a piece of food 13 to be cooked, and means 14 connecting said members and responsive to the temperature at a cooking area for indicating correct cooking time.

The leg members 11 and 12 are here mounted for movement toward and away from each other along a bar 16 and affording a type of calipers. The jaws provided by leg members 11 and 12 are movable toward each other and into contact with the opposite sides of the piece of food, such as the steak 13, to be cooked, the amount of space between the jaws thus corresponding to the thickness of the steak.

During operation of the indicator to measure thickness, the first jaw 11 preferably is secured to the bar 16, while the second jaw 12 is slidable along the bar.

The temperature indicating means 14 includes a scale 17, calibrated in units of time such as minutes, and thermostat means 18 connected to one of the jaws 11 or 12 and having a pointer 19 movable along the scale 17 in response to temperature changes.

Scale 17 is connectable to the other jaw for movement therewith and is dimensioned for shifting of the scale, relative to the pointer 19, in accordance with the distance between the jaws, whereby the pointer will indicate the correct number of minutes of cooking time directly on the scale.

As here shown, the scale 17 extends perpendicularly from jaw 11 along the bar 16, and the calibrations are located at the portion of the bar along which movable jaw 12 is located after measuring the thickness of the food 13.

The thermostatic means 18 here consists of a bimetal element of a well-known type in the thermostat art wherein thin strips of metal having different coefficients of expansion are bonded together to provide an elongated leaf. This leaf will flex in accordance with changes in temperature by bending in one direction as the temperature rises and bending in the opposite direction as the temperature falls.

As here shown, the leaf 18 is secured at one end to the outer end of jaw 12, as by a rivet 21 passing through the leaf and through ears 22 and 23 protruding from jaw 12. This leaves the opposite end of bimetal leaf 18 free to move along scale 17 and provide the temperature responsive pointer 19 cooperative with the scale. The bimetal element 18 is here designed to move toward jaw 11 as the temperature increases. Scale 17 is, accordingly, graduated to show shorter cooking times toward jaw 11.

Thicker pieces of food will naturally require a longer cooking time. As may be seen from FIGURE 1 of the drawing, the indicia on scale 17 grow larger as they recede further from jaw 11. Thus, the area over which the pointer 19 sweeps as it indicates the temperature of the cooking area (shown by phantom lines in FIGURE 1) intersects higher numerical time values on scale 17 and results in higher readings for thicker pieces of food at similar cooking temperatures.

Individual diners will often prefer different degrees of doneness in their food. For example, some people prefer steaks to be bloody rare, while others like them medium or well done. Provision is made for adjusting the present device to indicate correct cooking times for various degrees of doneness.

This may be accomplished by providing several sets of calibrations on the scale 17, or by changing scales, but preferably, and as here shown, the scale is adjustable along the bar 16. Here, scale 17 is slidable in a groove 24 extending the length of bar 16, and the scale is held in the desired position in the groove by a manually engageable, knurled head set screw 26 threadably engaged in the scale and bearing against the bar 16. Suitable indicia 27 may be provided on the scale 17 and bar 16 for locating the scale in the desired position.

A similar knurled head set screw 28 is provided for releasably securing movable leg 12 against accidental displacement along the bar 16 as the device is moved from the piece of food to the cooking area.

For ease in cleaning the device after use, it is also preferred to make the leg 11 slidable on the bar and to provide a knurled head set screw 29 for releasably clamping leg 11 in operative position.

In operation, jaw 11 and scale 17 are secured in desired position to bar 16. Jaw 12 is then positioned by engaging jaws 11 and 12 with the opposite sides of the piece of food to be cooked, and thumbscrew 28 is tightened to clamp jaw 12 in place.

The entire device is then transferred to the cooking area in the manner shown in FIGURE 4 wherein the device is laid upon the grill 31 of a barbecue brazier 32. The bimetal leaf 18 moves downwardly, as viewed in FIGURE 1, in response to the temperature at the cooking area to displace the pointer end 19 along the scale 17. When the pointer comes to rest, it will point to the correct number of minutes of cooking time on the scale 17.

The device is then removed, and the food 13 placed on the grill for the indicated number of minutes.

I claim:

1. In a cooking time indicator, a pair of members mounted for movement toward and away from each other for gauging the thickness of a piece of food placed therebetween, a scale marked off in units of time, and thermostatic means connected to one of said members and having a pointer movable relative to said scale in response to the temperature of a cooking area, said scale being connected to the other of said members for movement therewith so as to adjust the scale relative to said pointer in accordance with the distance between said members whereby said pointer will indicate correct cooking time on said scale.

2. In a cooking time indicator, a pair of members mounted for movement toward and away from each other for gauging the thickness of a piece of food placed therebetween, a scale marked off in units of time, and a bimetal thermostatic element mounted on one of said members and having a free end providing a pointer movable along said scale in response to temperatures at a cooking area, said scale being connected to the other of said members for movement therewith so as to adjust the scale relative to the pointer in accordance with the distance between said members whereby said pointer will indicate correct cooking time on said scale.

3. A cooking time indicator comprising an elongated bar, a first leg member secured to and projecting laterally from said bar, a second leg member mounted for movement along said bar and projecting therefrom in a direction similar to that of said first leg member, a scale along said bar, and a thermostatic element mounted on said second leg member and having a free end providing a pointer cooperative with said scale, said scale being calibrated in units of time along the path of said pointer whereby positioning of said leg members to indicate the thickness of a piece of food to be cooked and placing of said second leg member at the cooking area will cause said pointer to respond to the temperature thereat and to indicate correct cooking time on said scale.

4. A cooking time indicator comprising an elongated bar, a first leg member secured to and projecting laterally from said bar, a second leg member mounted for movement along said bar and projecting therefrom in a direction similar to that of said first leg member, a scale along said bar, and a thermostatic element mounted on said second leg member and having a free end providing a pointer cooperative with said scale, said scale being calibrated in units of time along the path of said pointer whereby positioning of said leg members to indicate the thickness of the food to be cooked and placing of said second leg member at the cooking area will cause said pointer to respond to the temperature thereat and indicate correct cooking time on said scale, said scale being movable along said bar for selecting the sector of said scale along which said pointer moves whereby the scale will indicate correct cooking time for the degree of doneness desired.

5. A cooking time indicator comprising an elongated bar, a first leg member secured to and projecting laterally from said bar, a second leg member mounted for movement along said bar and projecting therefrom in a direction similar to that of said first leg member, a scale along said bar, a thermostatic element mounted on said second leg member and having a free end providing a pointer cooperative with said scale, said scale being calibrated in units of time along the path of said pointer whereby positioning of said leg members to indicate the thickness of the piece of food to be cooked and placing of said second leg member at the cooking area will cause the said pointer to respond to the temperature thereat and indicate correct cooking time on said scale, said scale being movable along said bar for selecting the sector of said scale along which said pointer moves whereby the scale will indicate correct cooking time for the degree of doneness desired, indicia on said scale and bar for visually indicating correct positions for the degree of doneness, and manually operable means for securing said scale to said bar at the desired position.

6. A cooking time indicator comprising an elongated bar, a first leg member secured to and projecting laterally from said bar, a second leg member mounted for movement along said bar and projecting therefrom in a direction similar to that of said first leg member, means for releasably securing said second leg member to said bar at desired positions therealong, a scale along said bar, and a thermostatic element mounted on said second leg member and having a free end providing a pointer cooperative with said scale, said scale being calibrated in units of time along the path of said pointer whereby positioning of said leg members to indicate the thickness of a piece of food to be cooked and placing of said second leg member at the cooking area will cause said pointer to respond to the temperature thereat and indicate correct cooking time on said scale.

7. A gauge for determining correct cooking time for a piece of food of undetermined thickness at a cooking area of undetermined temperature, comprising an elongated bar, first and second leg members slidably mounted on said bar and extending laterally therefrom, a scale extending along said bar past said first leg member, and a bimetal leaf adapted for flexing in response to temperature changes and having an end secured to the outer end of said second leg member, said leaf extending therealong toward said scale and with the free end of said bimetal leaf providing a pointer for the scale, said scale being calibrated in units of time along the path of said pointer whereby positioning of said leg members to indicate the thickness of a piece of food to be cooked and placing of said second leg member at the cooking area will cause said pointer to respond to the temperature thereat and to indicate correct cooking time on said scale.

8. A gauge for determining correct cooking time for a piece of food of undetermined thickness at a cooking area of undetermined temperature, comprising an elongated bar, first and second leg members slidably mounted on said bar and extending laterally therefrom, a scale extending along said bar past said first leg member, a bimetal leaf adapted for flexing in response to temperature changes and having an end secured to the outer end of said second leg member, said leaf extending therealong toward said scale and with the free end of said bimetal leaf providing a pointer for the scale, and manually operable screw threaded means in said leg members and bearing against said bar for selectively locking said leg members in desired positions.

9. In a cooking time indicator, a pair of members mounted for movement toward and away from each other for gauging the thickness of a piece of food placed therebetween, an element carrying a scale marked off in units of time, temperature-responsive means having an indicating device movable over a defined area of said scale in response to the temperature of a cooking area, means responsive to relative positioning of said members for shifting the element relative to the indicating device in accordance with such positioning whereby said device will indicate correct cooking time on said scale.

References Cited in the file of this patent

UNITED STATES PATENTS

| | | |
|---|---|---|
| 425,208 | Carlyle | Apr. 8, 1890 |
| 540,272 | Rogers | June 4, 1895 |
| 602,069 | Foltz et al. | Apr. 12, 1898 |
| 853,262 | Putnam | May 14, 1907 |
| 1,341,865 | Solberg | June 1, 1920 |
| 2,716,343 | Wieszeck | Aug. 30, 1955 |

FOREIGN PATENTS

| | | |
|---|---|---|
| 1,053,202 | France | Sept. 30, 1953 |